(12) United States Patent
Chan et al.

(10) Patent No.: US 9,946,236 B2
(45) Date of Patent: Apr. 17, 2018

(54) ELECTRONIC DEVICE AND CONTROL METHOD THEREOF

(71) Applicant: Heng Yu Technology (Hong Kong) Limited, Hong Kong (HK)

(72) Inventors: Chun Kin Chan, Hong Kong (HK); Chun Kit Chan, Hong Kong (HK); Hoi Kai Chan, Hong Kong (HK)

(73) Assignee: Heng Yu Technology (Hong Kong) Limited, Hong Kong (HK)

( * ) Notice: Subject to any disclaimer, the term of this patent is extended or adjusted under 35 U.S.C. 154(b) by 755 days.

(21) Appl. No.: 14/476,769

(22) Filed: Sep. 4, 2014

(65) Prior Publication Data

US 2015/0112457 A1    Apr. 23, 2015

(30) Foreign Application Priority Data

Oct. 17, 2013 (HK) .................................. 13111689.8

(51) Int. Cl.
| | | |
|---|---|---|
| *G05B 15/02* | (2006.01) | |
| *H05B 33/08* | (2006.01) | |
| *G06F 3/02* | (2006.01) | |
| *G06F 3/033* | (2013.01) | |
| *G06F 3/038* | (2013.01) | |

(52) U.S. Cl.
CPC ............ *G05B 15/02* (2013.01); *G06F 3/0202* (2013.01); *G06F 3/033* (2013.01); *G06F 3/038* (2013.01); *H05B 33/0857* (2013.01); *G06F 2203/0337* (2013.01)

(58) Field of Classification Search
None
See application file for complete search history.

(56) References Cited

U.S. PATENT DOCUMENTS

| | | | |
|---|---|---|---|
| 2004/0100447 A1* | 5/2004 | Ozolins | G06F 3/021 345/170 |
| 2006/0005035 A1* | 1/2006 | Coughlin | G06F 21/35 713/182 |
| 2006/0022951 A1* | 2/2006 | Hull | A63F 13/06 345/170 |
| 2009/0024926 A1* | 1/2009 | Morotomi | G06F 1/1624 715/716 |

(Continued)

*Primary Examiner* — Tuan Dao
(74) *Attorney, Agent, or Firm* — Wayne & King LLC

(57) ABSTRACT

The present invention discloses an electronic device and control method thereof. The electronic device according to the present invention comprises a main engine and a USB man-machine interface unit connected thereto; an illuminating source and a drive circuit thereof are arranged on the USB man-machine interface unit; the USB man-machine interface unit receives illuminating information sent by the main engine, generates a control command according to the illuminating information and sends the control command to the drive circuit so as to drive the illuminating source. Because the present invention sends the illuminating information to the USB man-machine interface unit through the main engine and then obtains the control command to switch on or off the illuminating source after processing the illuminating information through the USB man-machine interface unit, a user can participate in controlling the illuminating source so as to realize an illuminating effect expected by the user.

5 Claims, 2 Drawing Sheets

(56) References Cited

U.S. PATENT DOCUMENTS

| | | | | |
|---|---|---|---|---|
| 2009/0172219 A1* | 7/2009 | Mardiks | ............ | G06F 9/445 |
| | | | | 710/67 |
| 2010/0302169 A1* | 12/2010 | Pance | ............ | G06F 3/0237 |
| | | | | 345/170 |
| 2013/0178292 A1* | 7/2013 | Casparian | ............ | G06F 3/0219 |
| | | | | 463/37 |
| 2013/0265740 A1* | 10/2013 | Lee | ............ | H01H 13/83 |
| | | | | 362/23.03 |

* cited by examiner

ELECTRONIC DEVICE AND CONTROL METHOD THEREOF

CROSS-REFERENCE TO RELATED APPLICATION

This application claims priority of Hong Kong short-term patent application no. 13111689.8, filed on Oct. 17, 2013; the entire contents of which are hereby incorporated by reference.

FIELD OF THE INVENTION

The present invention relates to the technical field of electronic products, and in particular, to an electronic device and control method thereof.

BACKGROUND OF THE INVENTION

In the times of scientific and technological information, a computer has become an indispensable requisite of people, and all works of life rely on the aid of the computer for work. At present, luminous backlight keyboards appear in the market. However, these backlight keyboards are usually controlled through the keyboards themselves. Generally the keyboards are stored with some backlight effects in advance, and the user starts these backlight effects by pressing hot-keys on the keyboards. However, this solution lacks data interaction between the computer host and the keyboard, and the host cannot control the backlight effects of the keyboard, and the user cannot customize some backlight effects appealing to him.

SUMMARY OF THE INVENTION

A technical problem for the present invention to solve is to provide an improved electronic device and control method thereof.

The technical solution adopted by the present invention to solve the technical problem is as follows:

an electronic device comprises a main engine and a USB man-machine interface unit connected thereto;

an illuminating source and a drive circuit thereof are arranged on the USB man-machine interface unit; and the USB man-machine interface unit receives illuminating information sent by the main engine, generates a control command according to the illuminating information and sends the control command to the drive circuit so as to drive the illuminating source.

Preferably, in the foregoing electronic device, the main engine comprises a processing module, and the illuminating information is obtained after the processing module processes a script file stored in the main engine and is sent to the USB man-machine interface unit.

Preferably, in the foregoing electronic device, the USB man-machine interface unit is a keyboard or a mouse or a joystick.

Preferably, in the foregoing electronic device, when the USB man-machine interface unit is a keyboard, the illuminating source comprises a plurality of LED lamps which are respectively arranged beside at least part of the keyboard, and the script file comprises key numbers of the keyboard.

Preferably, in the foregoing electronic device, the illuminating source comprises a plurality of LED lamps.

Preferably, in the foregoing electronic device, the illuminating information comprises lighting mode information and on-off information used for controlling the plurality of LED lamps.

Preferably, in the foregoing electronic device, the lighting mode comprises color, brightness and ray modes of the plurality of LED lamps.

An electronic device control method comprises the steps as follows.

A. A main engine sends illuminating information to a USB man-machine interface unit connected thereto.

B. The USB man-machine interface unit receives the illuminating information, generates a control command according to the illuminating information and sends the control command to the drive circuit, wherein the drive circuit is arranged on the USB man-machine interface unit.

C. The drive circuit sends a driving signal to the illuminating source according to the control command to switch on or off the illuminating source, wherein the illuminating source is arranged on the USB man-machine interface unit.

Preferably, in the foregoing electronic device control method, the method, before step A, further comprises step D: the main engine processes a script file stored in the main engine to obtain illuminating information, and sends the illuminating information to the USB man-machine interface unit, wherein the illuminating information is obtained after processing of a processing module in the main engine.

The present invention has the advantageous effects that: because the present invention sends the illuminating information to the USB man-machine interface unit through the main engine and then obtains the control command to switch on or off the illuminating source after processing the illuminating information through the USB man-machine interface unit, a user can participate in controlling the illuminating source so as to realize an illuminating effect expected by the user.

BRIEF DESCRIPTION OF DRAWINGS

The present invention is further described in details with reference to the accompanying drawings and specific embodiments, wherein in the drawings.

DETAILED DESCRIPTION OF THE EMBODIMENTS

In order to understand the technical features, objectives and effects of the present invention more clearly, the detailed description of the embodiments of the present invention is explained in details with reference to the accompanying drawings.

Figure 1:
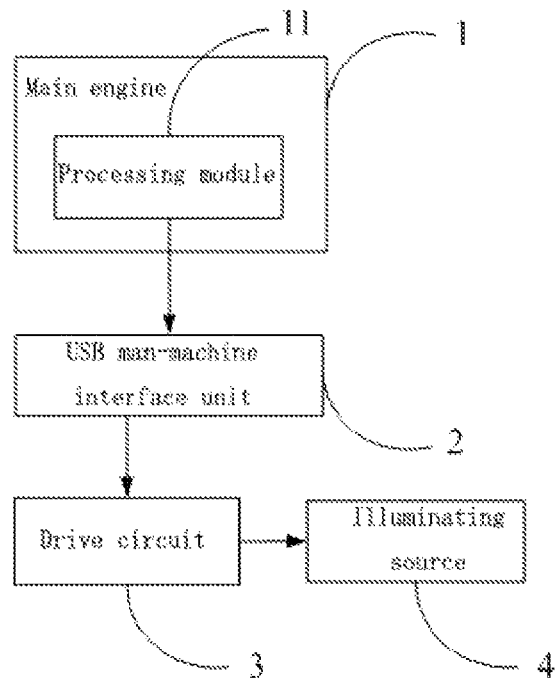
FIG. 1 is a structural schematic diagram of a first embodiment of the present invention.

FIG. 1 shows an electronic device according to one preferred embodiment of the present invention, which comprises a main engine 1 and a USB man-machine interface unit 2 connected thereto. The main engine 1 is used for sending illuminating information, and is generally a USB main engine control device which is connected to a USB device through a USB HID interface, and used for detecting and recognizing the USB device, and may perform such operations as connection, configuration, restoration and the like on the USB device.

An illuminating source 4 and a drive circuit thereof 3 are arranged on the USB man-machine interface unit 2.

The USB man-machine interface unit 2 receives illuminating information sent by the main engine 1, generates a control command according to the illuminating information and sends the control command to the drive circuit 3 so as to drive the illuminating source 4. The USB man-machine interface unit 2 receives the illuminating information sent by the main engine 1 in a manner of USB report forms, and stores the illuminating information, generates a control command after processing, and sends the control command to the drive circuit 3 so as to switch on or off the illuminating source 4.

The report forms comprise an input report form, an output report form and a feature report form. The main engine 1 utilizes the input report form to receive data sent by the USB man-machine interface unit 2, and the main engine utilizes the output report form to send data to the USB man-machine interface unit 2. The main engine 1 utilizes the feature report form to send data to the USB man-machine interface unit 2 and receives the data sent by the USB man-machine interface unit 2. In a specific embodiment, a feature report form is defined in the USB man-machine interface unit 2. The main engine sends the illuminating information to the USB man-machine interface unit 2 through the feature report form. The USB man-machine interface unit 2 reprocesses the illuminating information into a control command that can be recognized by the drive circuit 3.

It is understandable that the USB man-machine interface unit 2 is a keyboard or a mouse or a joystick. When the USB man-machine interface unit 2 is a keyboard, the illuminating source may be arranged beside or below the keys of the keyboard. When the USB man-machine interface unit 2 is a mouse, the illuminating source may be arranged on a roller wheel of the mouse. When the USB man-machine interface unit 2 is a joystick, the illuminating source may be arranged in the joystick.

The illuminating source 4 comprises a plurality of LED lamps.

Figure 2:
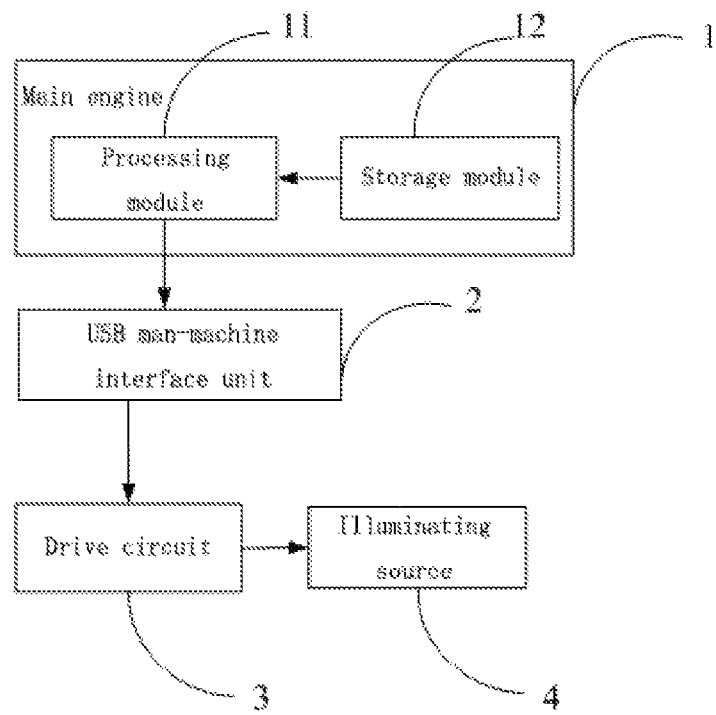
FIG. 2 is a structural schematic diagram of a second embodiment of the present invention.

As shown in FIG. 2, in another embodiment, the main engine 1 comprises a processing module 11, and the illuminating information is obtained after the processing module 11 processes a script file stored in the main engine 1, and is sent to the USB man-machine interface unit 2. When the USB man-machine interface unit 2 is the keyboard, the illuminating information after being processed by the processing module 11 and sent to the keyboard is stored in a shortcut on the keyboard. The script file is illuminating information pre-defined by the user, and stored in a storage module 12 in the main engine 1.

In some embodiments, a program file used for altering or adding illuminating information is stored in the main engine 1, and parameters of the program file are defined or modified by the user. It is understandable that an API (Application Programming Interface, application programming interface) library used for defining the lighting mode is stored in the storage module 12 in the main engine 1, and the API library is integrated into the program file so as to set the illuminating effects of the illuminating source of the USB man-machine interface unit 2.

In a specific embodiment, the illuminating information is obtained after the main engine processes the script file or the program file. The USB man-machine interface unit 2 downloads the illuminating information through a USB interface or an RS232 interface, and stores the illuminating information at the shortcut. When the illuminating information is needed, the user triggers the USB man-machine interface unit 2 by pressing the shortcut to generate a control command according to the illuminating information of the script file or the program file and send the control command to the drive circuit, so as to drive the illuminating source to realize illuminating effects expected by the user.

In some embodiments, when the USB man-machine interface unit 2 is a keyboard, the illuminating source 4 comprises a plurality of LED lamps which are respectively arranged beside at least part of the keyboard, and the script file comprises key numbers of the keyboard. The key numbers are corresponding to the plurality of LED lamps one by one. When the USB man-machine interface unit 2 is a keyboard and the main engine 1 sends the key numbers to the keyboard through the illuminating information, the lighting modes of different keys of the keyboard can be controlled. In another some embodiments, after the keys of the keyboard are numbered, the key numbers are stored in the script file, and are processed by the processing module 11 of the main engine 1. It is understandable that the keyboard can be numbered according to the key sequences on the keyboard in sequence.

In some embodiment, the illuminating information comprises lighting mode information and on-off information used for controlling the plurality of LED lamps. The lighting mode comprises color, brightness and ray modes of the plurality of LED lamps. The on-off information refers to the on-off information of the plurality of LED lamps, and may realize the change of the lighting quantity of the plurality of LED lamps. In a specific embodiment, the user edits a script file:

```
PRINT "QWER",300ms
CLEAR"Q"
PRINT"WERT",300ms
CLEAR"W"
PRINT"ERTY",300ms
CLEAR"E"
PRINT"RTYU",300ms,
```

The main engine after processing the script file through the processing module, obtains the illuminating information "05, 32, 255, 30", "05, 38, 255, 30", "05, 43, 255, 30" and "05, 44, 255, 30", wherein 05 is the byte of the illuminating information, and represents that one beam line is opened, 255 represents the brightness of the LED lamp, and 30 represents the lighting duration of the LED lamp. The main engine sends the illuminating information to the keyboard, and stores the illuminating information in the shortcut. The shortcut is customized as any key on the keyboard by the user. In the embodiment, the illuminating information sent by the main engine is stored at key R. When the user presses the key R, the keyboard processes the illuminating information sent from the main engine to the key R to obtain a control command, and sends the control command to the drive circuit. The drive circuit drives the keyboard to open a beam line started from the key R and ended at the key U. That is, the LED lamps of the keys Q, W, E and R are opened and last for 300 ms, then the LED lamps of the keys W, E, R and T are opened and last for 300 ms, then the LED lamps of the keys E, R, T and Y are opened and last for 300 ms, and finally the LED lamps of the keys R, T, Y and U are opened and last form 300 ms.

In a specific embodiment, the lighting mode of the plurality of LED lamps further comprises the state change of brightness and change sequence. The ray mode comprises beam-shaped rays, explosion rays, wavelike rays, cyclic rays and the like. Moreover, when the USB man-machine interface unit 2 is a keyboard, the lighting modes of each key on the keyboard may be different from each other.

Figure 3:
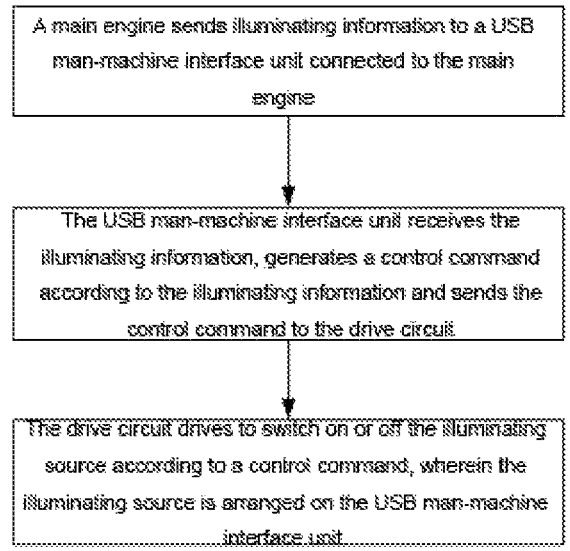
FIG. 3 is a flow schematic diagram of a method according to the first embodiment of the present invention.

An electronic device control method, as shown in FIG. 3, comprises the steps as follows.
- A. A main engine 1 sends illuminating information to a USB man-machine interface unit 2 connected thereto.
- B. The USB man-machine interface unit 2 receives the illuminating information, generates a control command according to the illuminating information and sends the control command to the drive circuit 3, wherein the drive circuit 3 is arranged on the USB man-machine interface unit 2.
- C. The drive circuit 3 sends a driving signal to the illuminating source 4 according to the control command to switch on or off the illuminating source, wherein the illuminating source 4 is arranged on the USB man-machine interface unit 2.

The method, before step A, further comprises step D: the main engine 1 processes a script file stored in the main engine to obtain illuminating information, and sends the illuminating information to the USB man-machine interface unit 2, wherein the illuminating information is obtained after the script file is processed by the processing module in the main engine.

In the first embodiment, as shown in FIG. 3, the main engine 1 sends the lighting mode required by the user to the USB man-machine interface unit 2 in a manner of illuminating information, and sends the lighting mode to the drive circuit 3 after the lighting mode is processed by the USB man-machine interface unit; the drive circuit receives a control command generated after the processing of the USB man-machine interface unit 2, drives the illuminating source 4 to open a corresponding optical source, so as to realize the lighting mode required by the user.

In a specific embodiment, taking the keyboard for example, the main engine sends a command to the keyboard through an USB HID interface, wherein the command comprises the illuminating information: 42 44 80. 42 is the byte of the illuminating information, representing to open the LED lamp; 44 is the number of the LED lamp on the keyboard; and 80 is the brightness of the LED lamp. The keyboard sends a response to the main engine through the feature report form, representing that the illuminating information is processed: ED 03 42 00 AC. Then, the LED lamp having a number of 44 is opened (the LED lamp beside the key having a key number of 44), for example, the key having a number of 44 is an "S" key on the keyboard, and the brightness is 80.

Figure 4:
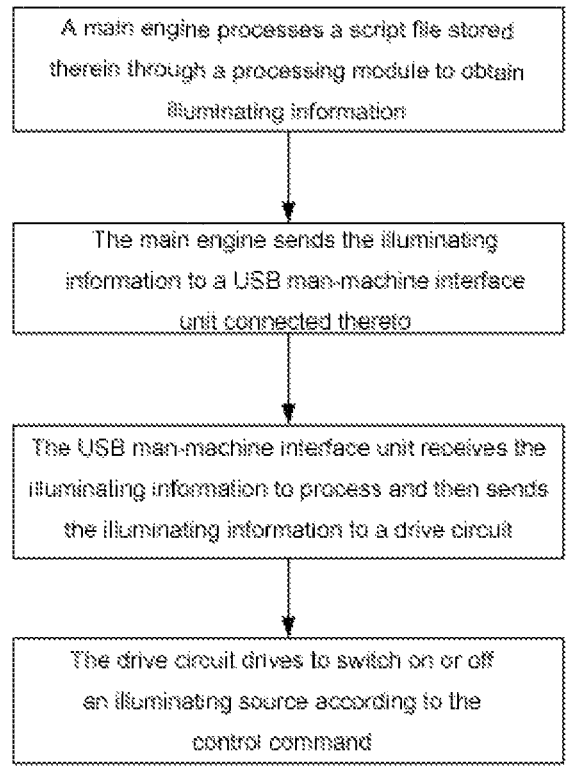
FIG. 4 is a flow schematic diagram of a method according to the second embodiment of the present invention.

In the second embodiment, as shown in FIG. 4, the main engine 1 sends the illuminating information obtained after the processing module 11 analyzes and processes the script file to the USB man-machine interface unit 2, and the USB man-machine interface unit 2 stores the illuminating information at the shortcut. When the user presses the shortcut, the USB man-machine interface unit 2 processes the illuminating information, generates a control command, and sends the control command to the drive circuit 3. The drive circuit 3 receives the control command processed by the USB man-machine interface unit 2, and drives the illuminating source 4 to open a corresponding optical source so as to realize the lighting mode required by the user.

In a specific embodiment, taking the keyboard for example, the user inputs a script file "LED on W, A, S, D turn on forever" in the main engine 1; and the main engine 1 sends the illuminating information "32, 255, 0", "33, 255, 0", "43, 255, 0" and "44, 255, 0" obtained after processing the script file to the keyboard through the USB HID interface. After the illuminating information is processed through the keyboard, the control command obtained is sent to the drive circuit. The drive circuit drives to switch on the LED lamps of the key W, key A, key S and key D, adjusts the brightness to 255, and switches on the LED lamps all the time.

The foregoing descriptions are merely preferred embodiments of the present invention, but are not intended to limit the present invention. Any modification, equivalent replacement or improvement figured out within the spirits and principles of the present invention shall all fall within the protection scope of the present invention.

We claim:

1. An electronic device, comprising a main engine and a keyboard connected thereto, wherein:
   - an illuminating source and a drive circuit thereof are arranged on the keyboard;
   - the keyboard receives illuminating information sent by the main engine in a manner of report forms, generates a control command according to the illuminating information and sends the control command to the drive circuit so as to drive the information source;
   - the report from comprises an input report form, an output report form and a feature report form; the main engine utilizes the input report form to receive data from the keyboard, utilizes the output report form to send data to the keyboard, and utilizes the feature report form to send data to the keyboard and receive data from the keyboard;
   - the main engine comprises a processing module, the illuminating information is obtained after the processing module processes a script file stored in the main engine; the keyboard downloads the illuminating information and stores the illuminating information at a shortcut on the keyboard; when the shortcut on the keyboard is triggered, the keyboard processes the illuminating information and generates the control command to be sent to the drive circuit.

2. The electronic device according to claim 1, wherein the illuminating source comprises a plurality of LED lamps which are respectively arranged beside at least part of the keyboard, and the script file comprises key numbers of the keyboard.

3. The electronic device according to claim 2, wherein the illuminating information comprises lighting mode information and on-off information used for controlling the plurality of LED lamps.

4. The electronic device according to claim 3, wherein the lighting mode comprises color, brightness and ray modes of the plurality of LED lamps.

5. An electronic device control method, comprising the steps as follows:
   - A. sending, by a main engine, illuminating information to a keyboard connected thereto in a manner of report forms, wherein the report forms comprise an input report form, an output report form and a feature report form;
   - B. receiving, by the keyboard, the illuminating information, downloading and storing the illuminating information at a shortcut of the keyboard, processing the illuminating information, generating a control command and sending the control command to a drive circuit, wherein the drive circuit is arranged on the keyboard; and C. sending, by the drive circuit, a driving signal to an illuminating source according to the control command to switch on or off the illuminating source, wherein the illuminating source is arranged on the keyboard;
wherein, before step A, the method further comprises the following steps:
D. processing, by the main engine, a script file stored in the main engine to obtain illuminating information, and sending the illuminating information to the keyboard, wherein the illuminating information is obtained after processing of a processing module in the main engine.

* * * * *